United States Patent
Bixon et al.

(10) Patent No.: US 12,383,905 B2
(45) Date of Patent: Aug. 12, 2025

(54) SPECIMEN HOLDER WITH WIRELESS TRANSPONDER FOR ATTACHMENT TO SPECIMEN COLLECTION BODY

(71) Applicant: TMRW Life Sciences, Inc., New York, NY (US)

(72) Inventors: Brian Joseph Bixon, Jersey City, NJ (US); Chengxi Li, Jersey City, NJ (US); Alan Murray, New York, NY (US)

(73) Assignee: TMRW Life Sciences, Inc., New York, NY (US)

( * ) Notice: Subject to any disclaimer, the term of this patent is extended or adjusted under 35 U.S.C. 154(b) by 0 days.

(21) Appl. No.: 18/674,493

(22) Filed: May 24, 2024

(65) Prior Publication Data

US 2024/0382968 A1 Nov. 21, 2024

Related U.S. Application Data

(63) Continuation of application No. 17/547,094, filed on Dec. 9, 2021, now Pat. No. 12,017,227.
(Continued)

(51) Int. Cl.
*B01L 3/00* (2006.01)

(52) U.S. Cl.
CPC ............... *B01L 3/54* (2013.01); *B01L 3/561* (2013.01); *B01L 2200/0689* (2013.01); *B01L 2200/12* (2013.01); *B01L 2300/0832* (2013.01)

(58) Field of Classification Search
CPC .... B01L 3/54; B01L 3/561; B01L 2200/0689; B01L 2200/12; B01L 2300/0832
See application file for complete search history.

(56) References Cited

U.S. PATENT DOCUMENTS

| 4,573,581 A | 3/1986 | Galloway et al. |
| D300,583 S | 4/1989 | Smith |

(Continued)

FOREIGN PATENT DOCUMENTS

| AU | 2011357590 B2 | 9/2015 |
| AU | 2017287017 A1 | 1/2019 |

(Continued)

OTHER PUBLICATIONS

"BioStore (TM) III Cryo" 2015, pp. 1-1, XP093203663, Internet Retrieved from the Internet:URL:https://corecryolab.com/wp-content/upl oads/2016/04/Brooks-BioStore-III-Cryo-One-Pager-Automation.
(Continued)

*Primary Examiner* — Jill A Warden
*Assistant Examiner* — Alex Ramirez
(74) *Attorney, Agent, or Firm* — Cozen O'Connor

(57) ABSTRACT

A specimen holder includes a body, a sleeve, and a wireless transponder. The body has distal and proximal portions, the distal portion including a surface that carries a specimen upon engagement of the body with the specimen, and the proximal portion including a first pair of parallel surfaces. The sleeve has distal and proximal portions, a side wall, and an internal cavity at least partially enclosed by the side wall. The distal portion of the sleeve includes a second pair of parallel surfaces. The wireless transponder is sized to be positioned within the internal cavity of the sleeve. The sleeve is attachable to the body by capturing one of the first and second pairs of parallel surfaces between the other of the first and second pairs of parallel surfaces.

6 Claims, 8 Drawing Sheets

Related U.S. Application Data

(60) Provisional application No. 63/123,959, filed on Dec. 10, 2020.

(56) References Cited

U.S. PATENT DOCUMENTS

| | | |
|---|---|---|
| D310,264 S | 8/1990 | Leoncavallo et al. |
| 5,024,830 A | 6/1991 | Linner |
| 5,176,202 A | 1/1993 | Richard |
| 5,355,684 A | 10/1994 | Guice |
| 5,545,562 A | 8/1996 | Cassou et al. |
| D382,809 S | 8/1997 | Aldrich et al. |
| D382,810 S | 8/1997 | Aldrich et al. |
| 5,711,446 A | 1/1998 | Jeffs et al. |
| 5,741,462 A | 4/1998 | Nova et al. |
| 5,751,629 A | 5/1998 | Nova et al. |
| 5,874,214 A | 2/1999 | Nova et al. |
| D408,145 S | 4/1999 | Au |
| 5,921,102 A | 7/1999 | Vago |
| 5,925,562 A | 7/1999 | Nova et al. |
| 5,964,095 A | 10/1999 | Coelho et al. |
| 6,066,300 A | 5/2000 | Carey et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| D484,797 S | 1/2004 | Kipperman et al. |
| 6,701,743 B1 | 3/2004 | Durst et al. |
| D496,398 S | 9/2004 | Greenberg |
| 6,888,063 B1 | 5/2005 | Lien et al. |
| D506,550 S | 6/2005 | Greenberg |
| 7,070,053 B1 | 7/2006 | Abrams et al. |
| 7,091,864 B2 | 8/2006 | Veitch et al. |
| D535,478 S | 1/2007 | Uffner et al. |
| 7,278,328 B2 | 10/2007 | Massaro |
| 7,316,896 B2 | 1/2008 | Kuwayama et al. |
| 7,350,703 B2 | 4/2008 | Ambartsoumian |
| 7,411,508 B2 | 8/2008 | Harazin et al. |
| D576,488 S | 9/2008 | Miota et al. |
| D592,966 S | 5/2009 | Nissen |
| 7,661,591 B2 | 2/2010 | Dearing et al. |
| 7,694,886 B2 | 4/2010 | Tan et al. |
| 7,861,540 B2 | 1/2011 | Cloutier et al. |
| 7,870,748 B2 | 1/2011 | Byrne |
| D642,697 S | 8/2011 | Gaefvert |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,168,138 B2 | 5/2012 | Che et al. |
| 8,378,827 B2 | 2/2013 | Davidowitz et al. |
| D682,045 S | 5/2013 | Myoung |
| 8,502,645 B2 | 8/2013 | Thomas et al. |
| 8,710,958 B2 | 4/2014 | Yang et al. |
| 8,790,597 B2 | 7/2014 | Childs et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,028,754 B2 | 5/2015 | Winter et al. |
| 9,033,251 B2 | 5/2015 | Weisshaupt et al. |
| D733,314 S | 6/2015 | Lui |
| 9,140,487 B2 | 9/2015 | Chaffey et al. |
| 9,163,869 B2 | 10/2015 | Warhurst et al. |
| 9,211,540 B2 | 12/2015 | Lansdowne |
| 9,280,738 B2 | 3/2016 | Dor et al. |
| 9,289,770 B2 | 3/2016 | Lavi |
| 9,297,499 B2 | 3/2016 | Jimenez-rios et al. |
| 9,418,265 B2 | 8/2016 | Morris et al. |
| 9,431,692 B2 | 8/2016 | Davidowitz et al. |
| D768,868 S | 10/2016 | Inoue |
| D771,271 S | 11/2016 | Zingre |
| 9,501,734 B2 | 11/2016 | Morris |
| 9,516,876 B2 | 12/2016 | Inoue |
| D777,941 S | 1/2017 | Piramoon |
| 9,538,746 B2 | 1/2017 | Inoue |
| 9,538,747 B2 | 1/2017 | Inoue |
| 9,547,782 B2 | 1/2017 | Lansdowne |
| 9,551,649 B2 | 1/2017 | Houghton et al. |
| 9,589,225 B2 | 3/2017 | Morris |
| 9,619,678 B2 | 4/2017 | Morris et al. |
| 9,697,457 B2 | 7/2017 | Morris |
| 9,723,832 B2 | 8/2017 | Camenisch et al. |
| 9,736,890 B2 | 8/2017 | Chaffey et al. |
| 9,764,325 B2 | 9/2017 | Davidowitz |
| 9,785,877 B1 | 10/2017 | Fink et al. |
| 9,796,574 B2 | 10/2017 | Frey et al. |
| 9,928,457 B2 | 3/2018 | Mcdowell |
| D816,165 S | 4/2018 | Haug |
| D835,472 S | 12/2018 | Seiders et al. |
| 10,156,386 B2 | 12/2018 | Bartlett et al. |
| D840,684 S | 2/2019 | Luburic |
| 10,207,270 B2 | 2/2019 | Lansdowne |
| 10,241,015 B2 | 3/2019 | Hollabaugh et al. |
| D845,139 S | 4/2019 | Wilson et al. |
| 10,328,431 B2 | 6/2019 | Davidowitz |
| 10,401,082 B2 | 9/2019 | Coradetti et al. |
| 10,493,457 B2 | 12/2019 | Croquette et al. |
| 10,531,657 B2 | 1/2020 | Farrington et al. |
| D874,875 S | 2/2020 | Huang |
| 10,561,141 B2 | 2/2020 | Suzuki et al. |
| D881,568 S | 4/2020 | Luburic |
| 10,677,810 B2 | 6/2020 | Grimwood et al. |
| D890,948 S | 7/2020 | Figueredo et al. |
| 10,748,050 B2 | 8/2020 | Morris et al. |
| D910,836 S | 2/2021 | Sandberg et al. |
| 10,973,226 B2 | 4/2021 | Blair et al. |
| 10,989,636 B2 | 4/2021 | Gutelius et al. |
| D928,343 S | 8/2021 | Bonnoitt et al. |
| D930,186 S | 9/2021 | Kim |
| D931,128 S | 9/2021 | Li |
| D932,906 S | 10/2021 | Schulz |
| 11,148,143 B2 | 10/2021 | Davidowitz et al. |
| 11,175,298 B2 | 11/2021 | Neeper et al. |
| D938,053 S | 12/2021 | Xiao |
| D945,271 S | 3/2022 | Halgren et al. |
| D963,194 S | 9/2022 | Bixon et al. |
| D981,801 S | 3/2023 | Wu |
| 2002/0190845 A1 | 12/2002 | Moore |
| 2002/0195234 A1 | 12/2002 | Wu |
| 2002/0196146 A1 | 12/2002 | Moore |
| 2003/0017082 A1 | 1/2003 | Van Deursen et al. |
| 2003/0174046 A1 | 9/2003 | Abrams |
| 2004/0100415 A1 | 5/2004 | Veitch et al. |
| 2005/0005614 A1 | 1/2005 | Iarocci et al. |
| 2005/0058483 A1 | 3/2005 | Chapman et al. |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1 | 12/2006 | Excoffier et al. |
| 2007/0068208 A1 | 3/2007 | Norman et al. |
| 2007/0172396 A1 | 7/2007 | Neeper et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0029341 A1 | 1/2009 | Fuhr et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0315205 A1 | 12/2010 | Egbert |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0137812 A1 | 6/2011 | Sherga |
| 2011/0143452 A1 | 6/2011 | Che et al. |

(56) References Cited

U.S. PATENT DOCUMENTS

| | | |
|---|---|---|
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0187197 A1 | 7/2012 | Masin |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2014/0008042 A1 | 1/2014 | Schryver et al. |
| 2014/0008355 A1 | 1/2014 | Chaffey et al. |
| 2014/0069119 A1 | 3/2014 | Katkov et al. |
| 2014/0157798 A1 | 6/2014 | Jimenez-rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0095309 A1 | 4/2016 | Reuteler |
| 2016/0101908 A1 | 4/2016 | Minnette et al. |
| 2016/0143270 A1 | 5/2016 | Schryver |
| 2016/0175837 A1 | 6/2016 | Chaffey et al. |
| 2016/0236387 A1 | 8/2016 | Carroll et al. |
| 2016/0288999 A1 | 10/2016 | Caveney et al. |
| 2016/0289000 A1 | 10/2016 | Caveney et al. |
| 2016/0341464 A1 | 11/2016 | Bagwell, Sr. |
| 2016/0349172 A1 | 12/2016 | Houghton et al. |
| 2016/0353730 A1 | 12/2016 | Harston et al. |
| 2016/0358062 A1 | 12/2016 | Morris |
| 2016/0372302 A1 | 12/2016 | Price et al. |
| 2017/0113909 A1 | 4/2017 | Frey et al. |
| 2017/0122846 A1 | 5/2017 | Holmes et al. |
| 2017/0166865 A1 | 6/2017 | Peng |
| 2017/0184479 A1 | 6/2017 | Schryver et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0086533 A1 | 3/2018 | Kjelland |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0154359 A1 | 6/2018 | Ueyama |
| 2018/0202908 A1 | 7/2018 | Croquette et al. |
| 2018/0313498 A1 | 11/2018 | Antola et al. |
| 2018/0368394 A1 | 12/2018 | Kjelland et al. |
| 2019/0000073 A1 | 1/2019 | Pederson et al. |
| 2019/0025280 A1 | 1/2019 | Kaditz et al. |
| 2019/0060892 A1 | 2/2019 | Davidowitz et al. |
| 2019/0092555 A1 | 3/2019 | Ma et al. |
| 2019/0162639 A1 | 5/2019 | Gutelius et al. |
| 2019/0193078 A1 | 6/2019 | Fiondella et al. |
| 2019/0250181 A1 | 8/2019 | Seeber |
| 2019/0276233 A1 | 9/2019 | Caveney et al. |
| 2019/0293344 A1 | 9/2019 | Sun et al. |
| 2019/0297877 A1 | 10/2019 | Komatsu et al. |
| 2020/0093122 A1 | 3/2020 | Lin et al. |
| 2020/0097788 A1 | 3/2020 | Pedersen et al. |
| 2020/0107541 A1 | 4/2020 | Blair et al. |
| 2020/0229427 A1 | 7/2020 | Kilbride et al. |
| 2020/0229429 A1 | 7/2020 | Blair et al. |
| 2020/0229430 A1 | 7/2020 | Blair et al. |
| 2020/0229431 A1 | 7/2020 | Blair et al. |
| 2020/0248638 A1 | 8/2020 | Engfehr et al. |
| 2020/0281191 A1 | 9/2020 | Ally et al. |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2022/0184625 A1 | 6/2022 | Bixon et al. |
| 2022/0192182 A1 | 6/2022 | Bixon et al. |
| 2023/0329230 A1 | 10/2023 | Li et al. |

FOREIGN PATENT DOCUMENTS

| | | |
|---|---|---|
| CA | 2972315 A1 | 8/2016 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 108112576 A | 6/2018 |
| CN | 207595583 U | 7/2018 |
| CN | 207663251 U | 7/2018 |
| CN | 207675193 U | 7/2018 |
| CN | 108541702 A | 9/2018 |
| CN | 109258627 A | 1/2019 |
| CN | 208425434 U | 1/2019 |
| CN | 110476952 A | 11/2019 |
| CN | 110517737 A | 11/2019 |
| CN | 209677194 U | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111771211 A | 10/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |
| CN | 213274464 U | 5/2021 |
| CN | 112894791 A | 6/2021 |
| CN | 213863260 U | 8/2021 |
| CN | 213863569 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| DE | 102011012887 A1 | 8/2012 |
| DE | 102016008869 A1 | 1/2018 |
| EP | 0411224 A2 | 2/1991 |
| EP | 0706825 A1 | 4/1996 |

(56) References Cited

FOREIGN PATENT DOCUMENTS

| | | | |
|---|---|---|---|
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |
| EP | 2358196 A1 | 8/2011 |
| EP | 2467465 A1 | 6/2012 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 2743865 B1 | 6/2019 |
| EP | 2866938 B1 | 6/2019 |
| EP | 3514732 A1 | 7/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| ES | 2467465 A2 | 6/2014 |
| ES | 2595984 T3 | 1/2017 |
| JP | 2000137031 A | 5/2000 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007066011 A | 3/2007 |
| JP | 2007235905 A | 9/2007 |
| JP | 2007532867 A | 11/2007 |
| JP | 2008021082 A | 1/2008 |
| JP | 2008522184 A | 6/2008 |
| JP | 2010521725 A | 6/2010 |
| JP | 2012526966 A | 11/2012 |
| JP | 5278978 B2 | 5/2013 |
| JP | 2014174647 A | 9/2014 |
| JP | 2015019244 A | 1/2015 |
| JP | 2015087306 A | 5/2015 |
| JP | 2017508984 A | 3/2017 |
| JP | 2017514499 A | 6/2017 |
| JP | 2017165487 A | 9/2017 |
| JP | 2018511782 A | 4/2018 |
| JP | 6343934 B2 | 6/2018 |
| JP | 2018136246 A | 8/2018 |
| JP | 2018529062 A | 10/2018 |
| JP | 2019505042 A | 2/2019 |
| JP | 2019518974 A | 7/2019 |
| JP | 2019536973 A | 12/2019 |
| KR | 20080070015 A | 7/2008 |
| KR | 102368093 B1 | 2/2022 |
| WO | 9216800 A1 | 10/1992 |
| WO | 0018225 A1 | 4/2000 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2011159934 A2 | 12/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014135890 A1 | 9/2014 |
| WO | 2014157798 A1 | 10/2014 |
| WO | 2014191757 A1 | 12/2014 |
| WO | 2015073964 A1 | 5/2015 |
| WO | 2015109315 A3 | 10/2015 |
| WO | 2015162680 A1 | 10/2015 |
| WO | 2016081755 A1 | 5/2016 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |
| WO | 2017014999 A1 | 1/2017 |
| WO | 2017075144 A1 | 5/2017 |
| WO | 2017109153 A1 | 6/2017 |
| WO | 2017149468 A1 | 9/2017 |
| WO | 2017215957 A1 | 12/2017 |
| WO | 2018000051 A1 | 1/2018 |
| WO | 2018002287 A1 | 1/2018 |
| WO | 2018005129 A1 | 1/2018 |
| WO | 2018025053 A1 | 2/2018 |
| WO | 2018039727 A1 | 3/2018 |
| WO | 2018041516 A1 | 3/2018 |
| WO | 2018097267 A1 | 5/2018 |
| WO | 2018215588 A1 | 11/2018 |
| WO | 2019005450 A1 | 1/2019 |
| WO | 2019182900 A1 | 9/2019 |
| WO | 2020033578 A1 | 2/2020 |
| WO | 2020072945 A1 | 4/2020 |
| WO | 2021086983 A1 | 5/2021 |
| WO | 2021097330 A1 | 5/2021 |
| WO | 2022066943 A1 | 3/2022 |

OTHER PUBLICATIONS

Document titled Description DE102016008869A1, machine translation of DE102016008869A1 provided by Espacenet, original document published 2018, original document already made of record in Applicant's Jun. 10, 2024 IDS (Year: 2018).

Environmental design, eight edition, The Charted institution of Building Services Engineers, 2016, section 3-36.

EP Search Report in EP App No. 22808100.6, mailed Mar. 6, 2025, 9 pages.

European Patent Search Report mailed Sep. 27, 2024 in EP Application No. 21873453.1. in 6 pages.

Extended European Search Report for European Application No. 21904425.2, dated Oct. 9, 2024, 9 pages.

Non Final Office Action for U.S. Appl. No. 17/552,327, mailed Feb. 10, 2025,15 pages.

"BioStore™ III Automated LN2 Sample Storage Solutions", brookslifesciences.com. Mar. 17, 2020 (Mar. 17, 2020), pp. 1-6.

"Abeyance Web App / Stay Connected", Jul. 6, Abeyance Cry Solutions—Abeyateck, LLC, 2021, 3 pages.

"IVF Witness System: RI Witness™ Art Management System", Confidence, Efficiency and Trust, IVF Witness System—RI Witness—

(56) References Cited

OTHER PUBLICATIONS

CooperSurgical Fertility Companies https//fertility.coopersurgical.com/equipment/ri-witness—Apr. 19, 2021, 28 pages.
"IVF Witness System: RI Witness™ Art Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: Row Oct. 24, 2018, 12 pages.
"S840 Lab Mover", Large Volume LNS Dry Vapor Shipper, Products Shipping, Jul. 6, Abeyance Cry Solutions—Abeyateck, LLC, 2021, 3 pages.
"Secure Your Future with Cryofuture", Https://cryofuture.com, 2004, 13 pages.
"Simple, Secure—190° C LN2 Vapor Storage", Products Shipping, Jul. 6, Abeyance Cry Solutions—Abeyateck, LLC, 2021, 7 pages.
"Your Partner for Local and Secure Cryostorage and Transportation", http://cryofuture.com, Clinic's workflow, 2024, 12 pages.
Australian Examination Report mailed Feb. 26, 2024, Application No. 2021348066, 8 pages.
Australian Examination Report mailed Jul. 10, 2024, Application No. 2021409471, 5 pages.
Australian Examination Report mailed Mar. 22, 2024, Application No. 2021396319, 5 pages.
Australian Examination Report mailed Mar. 28, 2024, Application No. 2022207973, 4 pages.
Australian Examination Report mailed Sep. 6, 2023, Application No. 2021276247, 5 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
Coopersurgical, RI Witness, Order No. CE 60010312 Version 3-Row: Oct. 24, 2018, 12 pages.
Cryogenic Vials, Standard. Online, published date unknown. Retrieved on Dec. 8, 2021 from URL: https://www.nextdayscience.com/cryogenic-vials-standard.htm.
CX100 Cryo Express Dry Shipper With Shipping Case. Online, published date unknown. Retrieved on May 24, 2022 from URL:https://www.mitegen.com/product/cryo-express-dry-shipper-cx100-with-case, 2 pages.
EP Search Report mailed Dec. 5, 2023, in EP App No. 20880407.0, 7 pages.
EP Search Report mailed Mar. 6, 2024 in EP App No. 22739992.0, 7 pages.
EP Search Report mailed Nov. 7, 2023, in EP App No. 21808453.1, Nov. 11, 2023.
European Search Report dated Aug. 7, 2023, for European Application No. 19869478.8, 5 pages.
Extended European Search Report dated Dec. 18, 2024, for European Application No. 21911908.8-1014, 9 pages.
Extended European Search Report dated Jun. 30, 2022, for European Application No. 19869478.8, 9 pages.
Extended European Search Report for Appl. No. 20887540.1/4058197 PCT/US2020060565, mailed Oct. 16, 2023, 8 pages.
Final Office Action mailed Jul. 15, 2024, for U.S. Appl. No. 18/100,977 in 22 pages.
IuidX Tri-Coded Jacket: 0.7ml Sample Storage Tube with External Thread; Brooks Life Sciences; https://bioinventory.biostorage.com, 2019, 7 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
HID Beyond Cool: RFID disentangles cryopreservation storage and management, 2015, 4 pages.

Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
International Search Report and Written Opinion for PCT/US2021/051803, mailed Jan. 12, 2022, 6 pages.
International Search Report and Written Opinion for PCT/US2021/062676, mailed Apr. 1, 2022, 9 pages.
International Search Report and Written Opinion for PCT/US2021/063608, mailed Apr. 12, 2022, 11 pages.
International Search Report and Written Opinion for PCT/US2022/012151, mailed Apr. 29, 2022, 9 pages.
International Search Report and Written Opinion for PCT/US2022/028185, mailed Aug. 26, 2022, 11 pages.
International Search Report and Written Opinion for PCT/US2022/077741, mailed date Feb. 1, 2023, 12 pages.
International Search Report and Written Opinion for PCT/US2023/078199 dated Feb. 26, 2024 in 15 pages.
International Search Report for PCT/US2021/032600, mailed Sep. 3, 2021, 4 pages.
Japanese Office Action for Japanese Patent Application No. 2022-525678, mailed May 29, 2023 (with English Translation) 12 pages.
Japanese Office Action for Japanese Patent Application No. 2022-525678, mailed Oct. 12, 2023 (with English Translation) 12 pages.
Japanese Office Action for JP 2022-569516, mailed Nov. 8, 2023, 6 pages {with English Translation).
Japanese Office Action, dated Jun. 6, 2023, for corresponding Japanese Application No. 2022-525679, 16 pages.
Japanese Office Action, dated Mar. 26, 2024, for corresponding Japanese Application No. 2023-519519, 15 pages.
Non Final Office Action for U.S. Appl. No. 17/083,179, mailed Sep. 1, 2022, 8 pages.
Non Final Office Action for U.S. Appl. No. 17/321,174, mailed Nov. 22, 2022, 26 pages.
Non-Final Office Action Issued in U.S. Appl. No. 16/840,270, Mailed Sep. 21, 2021, 58 pages.
Non-Final Office Action Issued in U.S. Appl. No. 18/100,977, mailed Jan. 19, 202, 29 pages.
Notice of Allowance for U.S. Appl. No. 17/321,174, mailed Jul. 12, 2023, 13 pages.
Notice of Allowance for U.S. Appl. No. 29/847,793, mailed Jul. 27, 2023, 2 pages.
Notice of Allowance mailed Jan. 4, 2022, for "Cryogenic Vial", U.S. Appl. No. 29/748,815, 9 pages.
Notice of Reasons for Refusal for Japanese Patent Application No. 2021-518707, mailed May 11, 2022, 11 pages.
Notice of Reasons for Refusal. Japanese Application No. 2023-518185, dated Jun. 17, 2024, 8 pages.
Notice of Reasons for Refusal. Japanese Application No. 2023-534389, dated May 28, 2024, 9 pages.
Notice of Reasons for Refusal. Japanese Application No. 2023-535428, dated May 30, 2024, 11 pages.
Notice of Reasons for Rejection, issued in corresponding Japanese Application No. 2021-518707, dated May 11, 2022, 5 pages.
Office Action dated Sep. 3, 2020, for U.S. Appl. No. 16/840,718, 46 pages.
OXO Airtight Pet Food Storage POP Container. Online published date unknown. Retrieved on May 24, 2022 from URL: https://www.walmart.com/ip/oxo-pet-food-storage-pop-container/623284606, 1 page.
Maggiulli, et al., "Implementing an electronic witnessing system into a busy IVF clinic—one clinic's experience", Genera Center for Reproductive Medicine, Rome, Italy, 2 pages.
Rienzi, et al., Poster Witness "Electronic Witness System makes patients less concerned about biological sample mix-up errors and

(56) References Cited

OTHER PUBLICATIONS comfortable with IOVF clinical practice", Genera Center for Reproductive Medicine, Via de Notaris 2b, 00197, Rome, Italy. 2015, 1 page.

Swedberg, Claire, "Hitachi Chemical Markets Tiny UHF Tag", https://www.rfidjournal.com/hitachi-chemical-markets-tiny-uhf-tag, Sep. 12, 2010, 4 pages.

Thornhill, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.

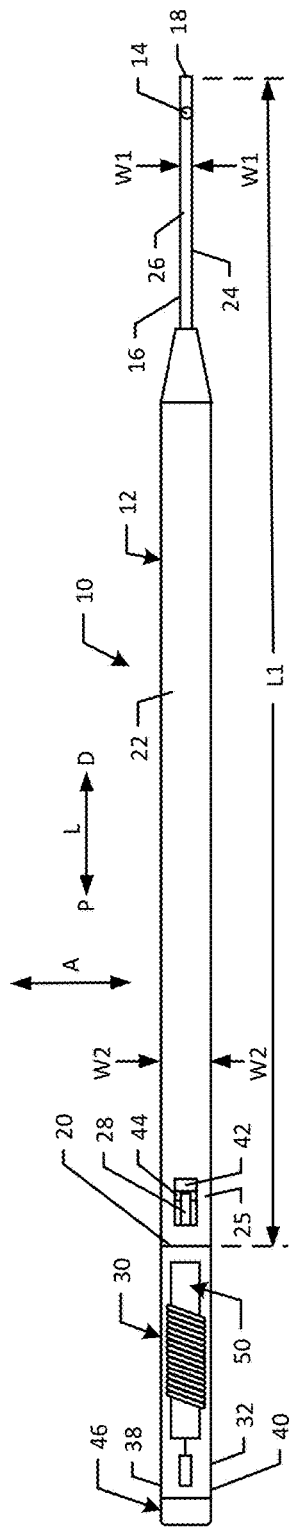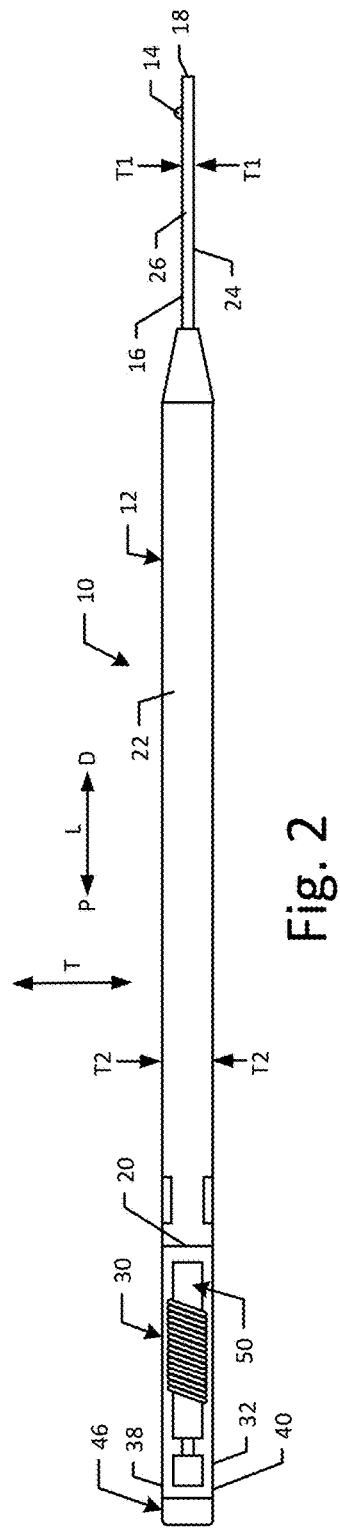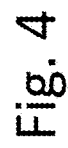

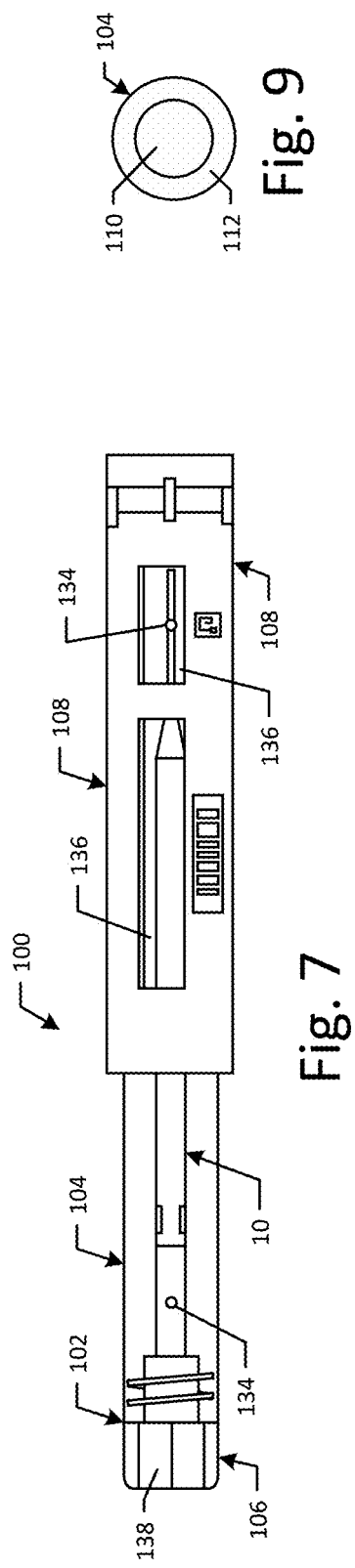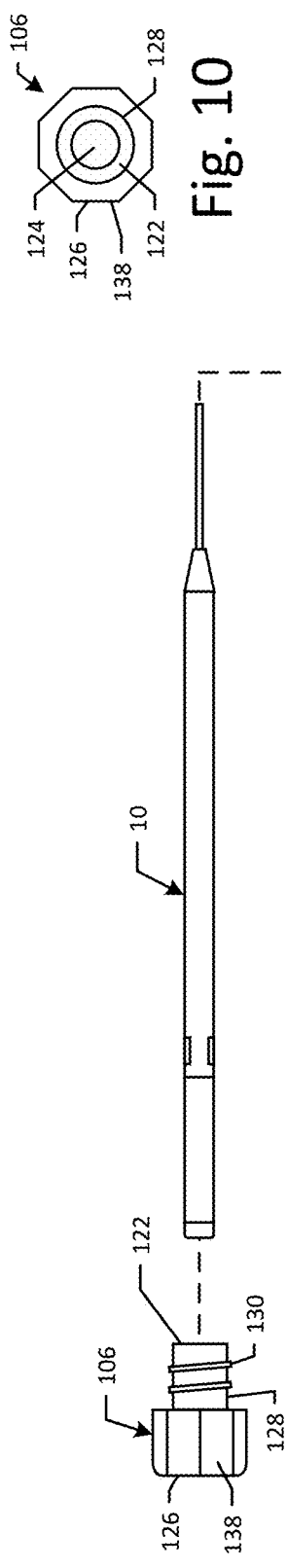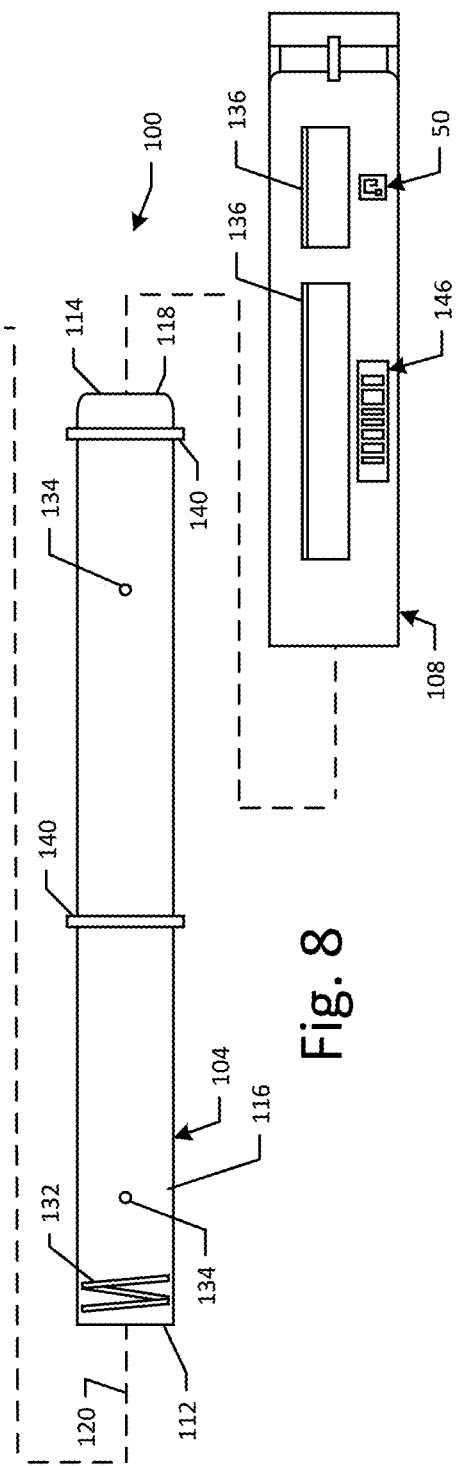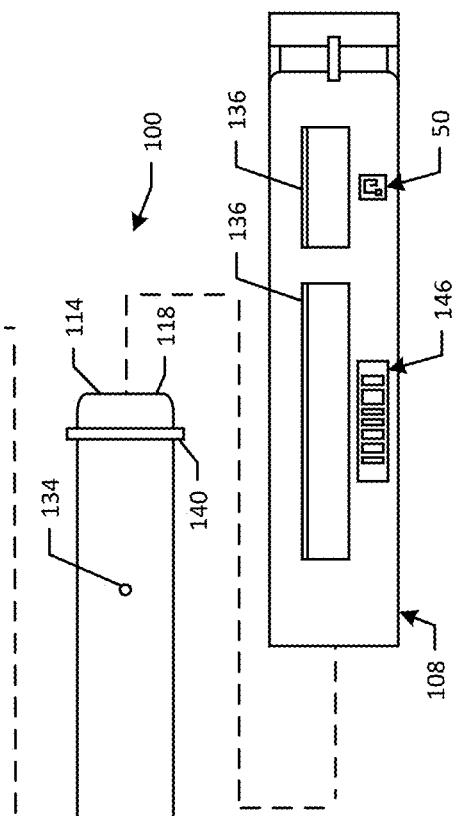

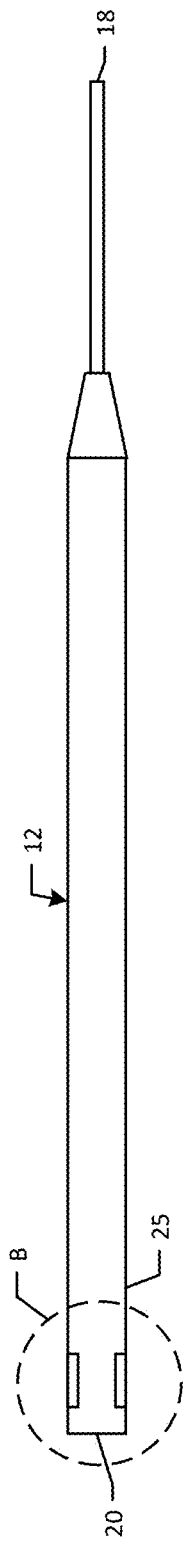
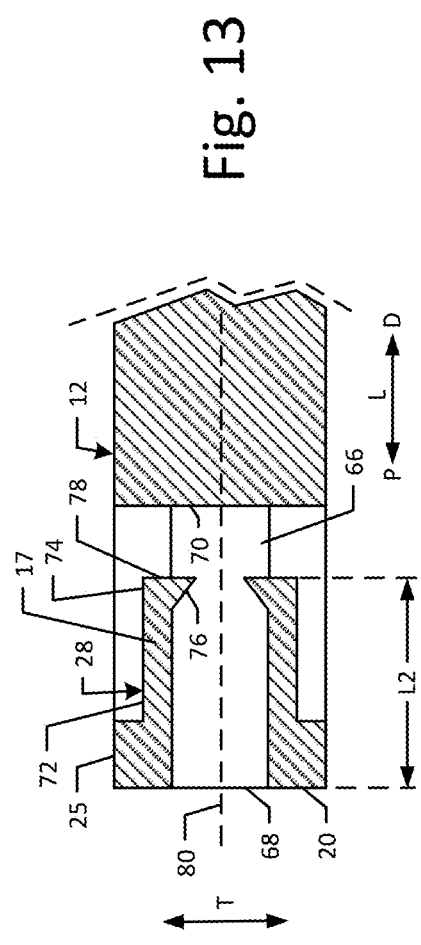
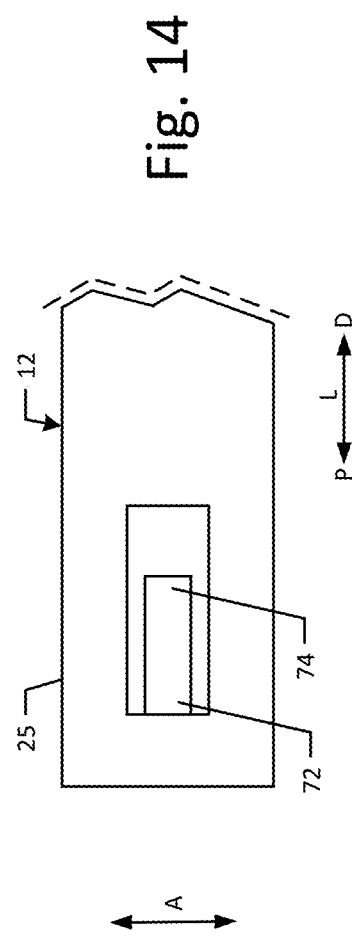
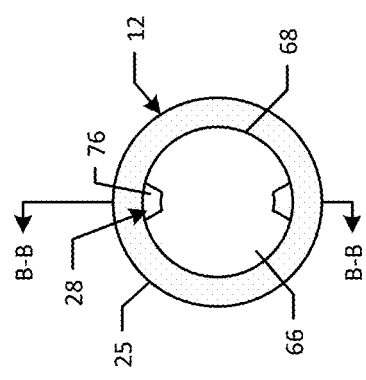

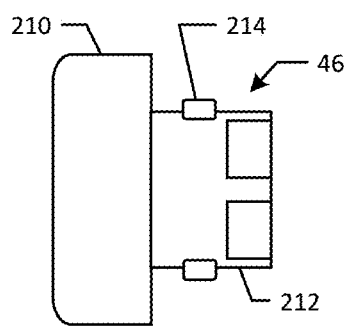
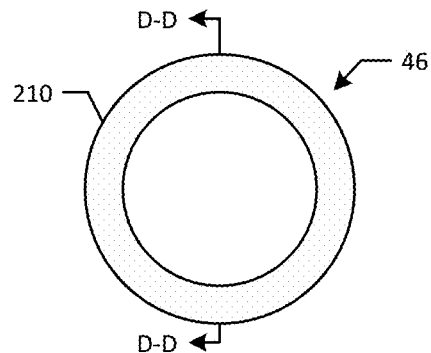
Fig. 18              Fig. 19
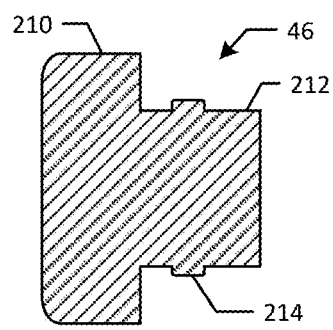
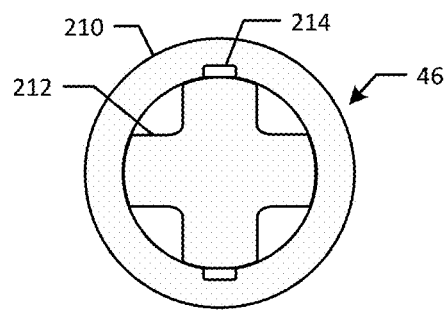
Fig. 20              Fig. 21

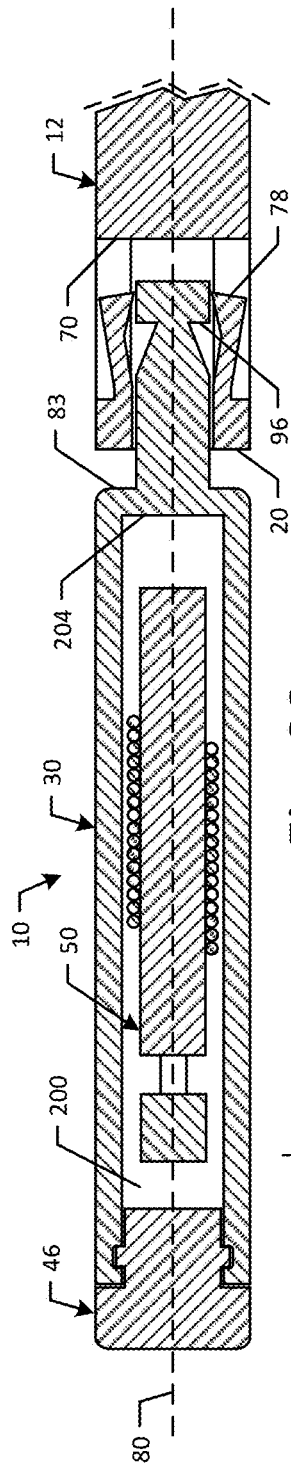
Fig. 22
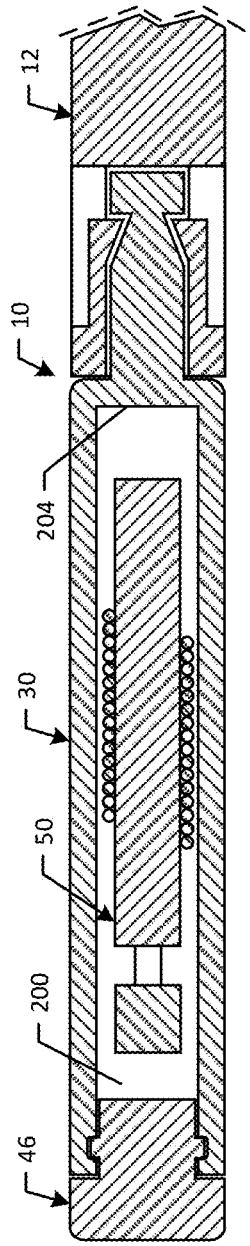
Fig. 23
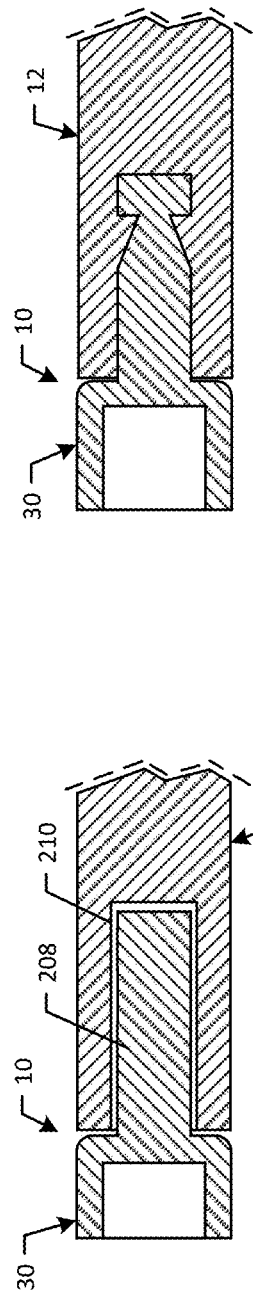
Fig. 24
Fig. 25

SPECIMEN HOLDER WITH WIRELESS TRANSPONDER FOR ATTACHMENT TO SPECIMEN COLLECTION BODY

BACKGROUND

Technical Field

The present disclosure relates generally to systems and methods of specimen collection, and specifically to a wireless transponder attachable to a specimen holder used to collect and store biological specimen and facilitate identification of stored biological specimen, for example during an IVF procedure.

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological sample (e.g., an oocyte, an embryo, a biopsy) contained in or on a storage device (e.g., a cryopreservation straw, cryopreservation tube, stick or spatula) is rapidly cooled by placing the biological sample and the storage device in a substance, such as liquid nitrogen. This results in a glass-like solidification or glassy state of the biological sample (e.g., a glass structure at the molecular level), which maintains the absence of intracellular and extracellular ice (e.g., reducing cell damage and/or death) and, upon thawing, improves post-thaw cell viability. To ensure viability, the vitrified biological samples are then typically continuously stored in a liquid nitrogen dewar or other container, which is at a temperature conducive to cryopreservation, for example negative 196 degrees Celsius.

There are, however, a number of concerns in how these biological samples are being stored, identified, managed, inventoried, retrieved, etc.

For example, each harvested embryo is loaded on a rigid embryo straw, tube, stick or spatula. The tube may be open at one end that receives the harvested embryo and closed (e.g., plugged) at the other end. The cryopreservation storage devices containing or holding the embryos are cooled as quickly as possible by plunging the cryopreservation storage device with the biological material into liquid nitrogen at a temperature of approximately negative 196 degrees Celsius, for example to achieve vitrification.

More particularly, multiple cryopreservation storage devices are placed in a goblet for placement in the liquid nitrogen storage tank. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (e.g., a cryopreservation storage device number, a practitioner number, etc.).

Stored biological samples can be identified by writing on the storage devices themselves, or by labels stuck to the storage devices. These labels may be handwritten or printed and can include bar codes. However, such methods of identification have associated disadvantages. Written notes on containers can be erased or smudged and labels can fall off the storage devices while they are stored inside the dewar leading to unidentifiable samples. These problems are exacerbated by the cold conditions in which biological samples are kept.

When performing an audit of biological samples stored in cold storage (typically at temperatures of negative 196 degrees Celsius), warming of the samples to a temperature greater than negative 130 degrees Celsius is to be avoided. It is therefore desirable to minimize the amount of time spent outside of the dewar wherever possible.

Recording, monitoring and auditing of samples in cold storage takes a considerable amount of time and effort, even when samples are labelled using barcodes. An additional and undesirable increase in the time taken to record or audit samples arises as a result of frost which can form on the surfaces of the storage devices and their labels when they are removed from liquid nitrogen into relatively warmer temperatures. A layer of frost blocks optical observance of the identification information, and the layer of frost also diffracts the light of a bar code reader. The container cannot be warmed up to remove frost as this would lead to destruction of the sample. The frost can be wiped off the disposable container but this contributes to an undesirable increase in the amount of time taken to read the sample.

Accordingly, it is desirable to provide a new apparatus for collecting, preserving, and identifying biological samples (e.g., vitrified biological samples) at suitably cold temperatures.

BRIEF SUMMARY

According to one aspect of the disclosure, a specimen holder includes a body, a sleeve, and a wireless transponder. The body is elongated along a body longitudinal axis, and the body has distal and proximal ends. The proximal end is opposite the distal end with respect to the longitudinal axis, and the body includes both a distal portion that includes the distal end and a proximal portion that includes proximal end. The distal portion further includes a surface that carries a specimen upon engagement of the body with the specimen, and the proximal portion includes a first body surface and a second body surface that are each angularly offset with respect to the longitudinal axis.

The sleeve is elongated along a sleeve longitudinal axis and includes first and second sleeve surfaces. The first sleeve surface is complimentary to the first body surface and the second sleeve surface is complimentary to the second body surface. The sleeve is attachable to the body such that the first sleeve surface and the first body surface face toward one another and the second sleeve surface and the second body surface face toward one another. The wireless transponder is attached to the sleeve.

A respective one of the body or the sleeve carries a moveable member that includes: the first body surface; the second body surface; both the first body surface and the second body surface; the first sleeve surface; the second sleeve surface; or both the first sleeve surface and the second sleeve surface. The moveable member is movable relative to the respective one of the body or the sleeve such that the surface or surfaces carried by moveable member are moveable toward and away from the respective one of the body longitudinal axis or the sleeve longitudinal axis.

According to another aspect of the disclosure, a method of assembling a specimen holder includes attaching a wireless transponder to a sleeve, and attaching a distal portion of the sleeve to a proximal portion of a body. The body is elongated along a body longitudinal axis, the proximal portion of the body is opposite a distal portion of the body with respect to the body longitudinal axis, and the distal portion of the body includes a specimen retention surface. The method further includes moving at least one of the sleeve and the body relative to the other of the sleeve and the body in a first direction that is parallel to the body longitudinal axis. While moving at least one of the sleeve and the body relative to the other of the sleeve and the body, the method further includes: moving a first surface carried by a movable member away from the body longitudinal axis, and moving the first surface carried by the movable member toward the body longitudinal axis.

After moving at least one of the sleeve and the body relative to the other of the sleeve and the body, the method further includes aligning the first surface with a second surface thereby blocking movement of the sleeve relative to the body along one direction parallel to the body longitudinal axis. The method further includes aligning a third surface with a fourth surface thereby blocking movement of the sleeve relative to the body along the other direction parallel to the body longitudinal axis. One of the body and the sleeve carries the movable member and the other of the body and the sleeve includes the second surface. The one of the body and the sleeve includes the third surface, and the other of the body and the sleeve includes the fourth surface.

According to another aspect of the disclosure a structure for attachment to a specimen collection body includes a sleeve and a wireless transponder. The sleeve has a snap fit portion at one end thereof that is sized to snap fit to a complimentary snap fit structure on an end of the specimen collection body. The wireless transponder is attached to the sleeve, and the wireless transponder includes at least one antenna and a microchip communicatively coupled to the at least one antenna.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 1 is a top, plan view of a specimen holder, according to one embodiment.

FIG. 2 is a side, elevation view of the specimen holder illustrated in FIG. 1.

FIG. 3 is a front, elevation view of the specimen holder illustrated in FIG. 1.

FIG. 4 is a rear, elevation view of the specimen holder illustrated in FIG. 1.

FIG. 7 is a side, elevation view of a container according to one embodiment, the container enclosing the specimen holder illustrated in FIG. 1.

FIG. 8 is an exploded, side, elevation view of the container and the specimen holder illustrated in FIG. 7.

FIG. 9 is a rear, elevation view of a vial of the container illustrated in FIG. 7.

FIG. 10 is a front, elevation view of a cap of the container illustrated in FIG. 7.

FIG. 11 is a side, elevation view of a body of the specimen holder illustrated in FIG. 1, according to one embodiment.

FIG. 12 is a rear, elevation view of the body illustrated in FIG. 11.

FIG. 13 is a cross-sectional, side view of a portion of the body illustrated in FIG. 11 identified by callout B, along line B-B.

FIG. 14 is a top, plan view of a portion of the body illustrated in FIG. 11 identified by callout B.

FIG. 18 is a side, elevation view of a cap of the specimen holder illustrated in FIG. 1, according to one embodiment.

FIG. 19 is a rear, elevation view of the cap illustrated in FIG. 18.

FIG. 20 is a cross-sectional, side, view of the cap illustrated in FIG. 18, along line D-D.

FIG. 21 is a front, elevation view of the cap illustrated in FIG. 18.

FIG. 22 is a cross-sectional, side view of a portion of the specimen holder illustrated in FIG. 1, along line A-A, during one stage of assembly, according to one embodiment.

FIG. 23 is a cross-sectional, side view of the portion of the specimen holder illustrated in FIG. 22, along line A-A, during another stage of assembly, according to one embodiment.

FIG. 24 is a cross-sectional, side view of a portion of the specimen holder illustrated in FIG. 1, along line A-A according to another embodiment.

FIG. 25 is a cross-sectional, side view of a portion of the specimen holder illustrated in FIG. 1, along line A-A according to another embodiment.

DETAILED DESCRIPTION

Figure 5:
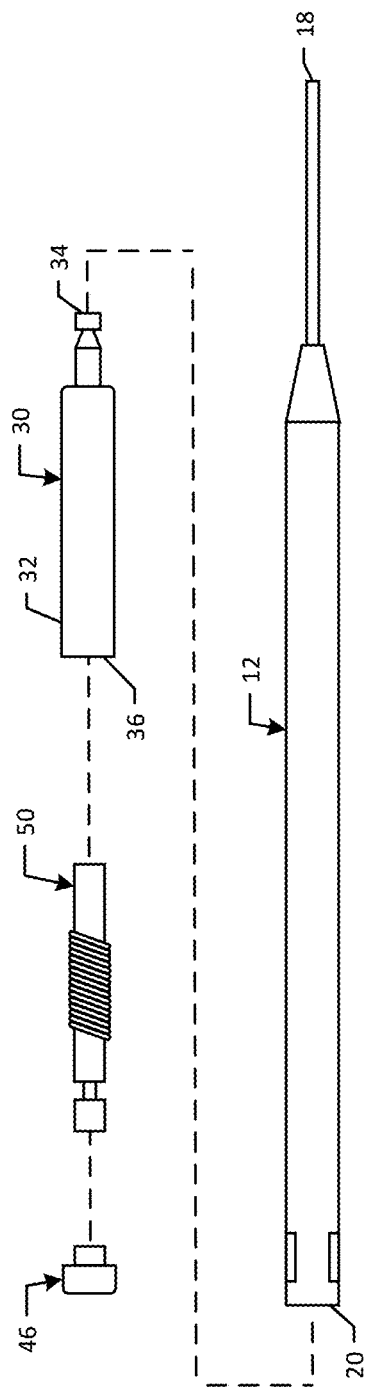
FIG. 5 is an exploded, side, elevation view of the specimen holder illustrated in FIG. 1.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with specimen holders have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "an embodiment," or "an aspect of the disclosure" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Reference herein to two elements "facing" or "facing toward" each other indicates that a straight line can be drawn from one of the elements to the other of the elements without contacting an intervening solid structure. Reference herein to two elements being "directly coupled" indicates that the two elements physically touch with no intervening structure between. Reference herein to a direction includes two components that make up said direction. For example a longitudinal direction, which is bidirectional, includes both a "distal" component (unidirectional) and a "proximal" component (unidirectional), which is opposite the "distal" component. Reference to an element extending along a direction means the element extends along one or both of the components that make up the direction.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Referring to FIGS. 1 to 5, a specimen holder 10 includes a body 12 that carries a specimen 14, such as a biological materials and/or samples (e.g., eggs, sperm, and zygotes). The body 12 may be in the form of a stick 16 as shown in the illustrated embodiment. According to another embodiment, the body 12 may be in the form of, for example, a spatula, a straw, or a tube. The body 12 may be a monolithic structure, according to one embodiment.

The body 12 may be elongated along a direction, for example a longitudinal direction L, as shown in the illustrated embodiment. The body 12, may include a distal end 18 and a proximal end 20. As shown in the illustrated embodiment, the proximal end 20 may be opposite the distal end 18 with respect to the longitudinal direction L. According to one embodiment, the body 12 may extend in a distal component D of the longitudinal direction L from the proximal end 20 and terminate at the distal end 18, and the body 12 may extend in a proximal component P of the longitudinal direction L, opposite the distal component D, from the distal end 18 and terminate at the proximal end 20.

The distal end 18 may include a surface that faces in the distal component D, as shown in the illustrated embodiment. The proximal end 20 may include a surface that faces in the proximal component P, as shown in the illustrated embodiment. The body 12 has a length L1 measured from one of the distal end 18 and the proximal end 20 to the other of the distal end 18 and the proximal end 20 along the longitudinal direction L.

The body 12 may include an outer surface 22 that extends from the distal end 18 to the proximal end 20. According to one embodiment, the outer surface 22 includes any surface of the body 12 that does not face toward any other surface of the body 12. The body 12 may include a distal portion 24 and a proximal portion 25. As shown, the distal portion 24 may carry the specimen 14 upon engagement of the body 12 with the specimen 14. The distal portion 24 may be positioned closer to the distal end 18 than the proximal portion 25 is from the distal end 18. Similarly, the proximal portion 25 may be positioned closer to the proximal end 20 than the distal portion 24 is from the proximal end 20.

The distal portion 24 may include a specimen surface 26 shaped to retain the specimen 14, for example against a force of gravity when the body 12 is arranged such that the longitudinal direction L is parallel to the force of gravity. The specimen surface 26 may be substantially planar, as shown in the illustrated embodiment. The specimen surface 26 may be curved, for example concave according to one embodiment. The specimen surface 26 may include texturing, grooves, or both. The specimen surface 26 may be a portion of the outer surface 22. Alternatively, the specimen surface 26 may be an internal surface, for example in an embodiment in which at least a portion of the body 12 is a tube.

The distal portion 24 may have a non-circular cross-sectional shape within a distal plane P1 that is normal to the longitudinal direction L and that intersects the distal portion 24. According to one embodiment, the distal plane P1 may further intersect the distal end 18, the specimen surface 26, or both.

The body 12 may have a width measured from one point on the outer surface 22 to another point on the outer surface 22 that is opposite the one point with respect to a lateral direction A, which is perpendicular to the longitudinal direction L. The width may vary at different locations along the length L1 of the body 12. For example, the body 12 may have a minimum width W1 at the distal portion 24, for example at the distal end 18. The body 12 may have a maximum width W2 at the proximal portion 25, for example at the proximal end 20. According to one embodiment, the distal portion 24 may include a constant width along the length of the distal portion 24. According to another embodiment, the width may taper along the distal portion 24.

The body 12 may have a thickness measured from one point on the outer surface 22 to another point on the outer surface 22 that is opposite the one point with respect to a transverse direction T, which is perpendicular to both the longitudinal direction L, and the lateral direction A. The thickness may vary at different locations along the length L1 of the body 12. For example, the body 12 may have a minimum thickness T1 at the distal portion 24, for example at the distal end 18. The body 12 may have a maximum thickness T2 at the proximal portion 25, for example at the proximal end 20. According to one embodiment, the distal portion 24 may include a constant thickness along the length of the distal portion 24. According to another embodiment, the thickness may taper along the distal portion 24.

According to one embodiment, the distal portion 24 may be shaped such that the width of the distal portion 24, for example the minimum width W1, is greater than the thickness of the distal portion 24, for example the minimum thickness T1. According to another embodiment, the distal portion 24 may be shaped such that the width of the distal portion 24, for example the minimum width W1, is equal to or less than the thickness of the distal portion 24, for example the minimum thickness T1. According to one embodiment, the proximal portion 25 may be shaped such that the width of the proximal portion 25, for example the maximum width W2, is greater than the thickness of the proximal portion 25, for example the maximum thickness T2. According to another embodiment, the proximal portion 25 may be shaped such that the width of the proximal portion 25, for example the maximum width W2, is equal to or less than the thickness of the proximal portion 25, for example the maximum thickness T2.

The specimen holder 10 may include a transponder fitting, in the form of, according to one embodiment a sleeve 30. The sleeve 30 may be attachable to the body 12, for example the proximal portion 25 of the body 12. According to one embodiment, the sleeve 30 may be releasably attachable to the body 12 such that once attached, the sleeve 30 and the body 12 are separable without plastic deformation of either of the sleeve 30 and the body 12. According to one embodiment, the sleeve 30 may be non-releasably attachable to the body 12 such that once attached, the sleeve 30 and the body 12 are not separable without plastic deformation of at least one of the sleeve 30 and the body 12.

The sleeve 30 includes a sleeve body 32, and the sleeve body 32 may be elongated along a direction, for example the longitudinal direction L, when attached to the body 12 as shown in the illustrated embodiment. The sleeve 30 may include a distal end 34 and a proximal end 36. As shown in the illustrated embodiment, the proximal end 36 may be opposite the distal end 34 with respect to the longitudinal direction L. According to one embodiment, the sleeve body 32 may extend in the distal component D of the longitudinal direction L from the proximal end 36 and terminate at the distal end 34, and the sleeve body 32 may extend in the proximal component P of the longitudinal direction L from the distal end 34 and terminate at the proximal end 36. The sleeve body 32 may be transparent or translucent such that objects enclosed within the sleeve 30 are visible through the sleeve body 32. According to one embodiment the sleeve body 32 may be opaque such that objects enclosed within the sleeve 30 are not visible through the sleeve body 32. According to one embodiment the sleeve body 32 may include an electrically insulative material.

The distal end 34 may include a surface that faces in the distal component D, as shown in the illustrated embodiment. The proximal end 36 may include a surface that faces in the proximal component P, as shown in the illustrated embodiment. The sleeve body 32 may include an outer surface 38 that extends from the distal end 34 to the proximal end 36. According to one embodiment, the outer surface 38 includes any surface of the sleeve body 32 that does not face toward any other surface of the sleeve body 32.

The sleeve body 32 may include a distal portion 40 and a proximal portion 42. As shown, the distal portion 24 may carry a coupler 44 that engages with a corresponding coupler 28 of the body 12 to attach the sleeve 30 to the body 12. According to one embodiment, the distal portion 40 may be positioned closer to the body 12 than the proximal portion 42 is from the body 12, when the sleeve 30 is attached to the body 12. Similarly, the proximal portion 42 may be positioned farther from the body 12 than the distal portion 40, when the sleeve 30 is attached to the body 12.

According to one embodiment, the proximal end 36 may be open (as will be described below), and the specimen holder 10 may include a cap 46 attachable to the proximal portion 40 of the sleeve 30 to close the open proximal end 36. According to one embodiment, the proximal end 36 may be closed (as will be described below), and the specimen holder 10 may be devoid of the cap 46.

The specimen holder 10 may include a wireless transponder 50. The wireless transponder 50 may take a variety of forms. For example, the wireless transponder may be in the form of an active, passive, or battery-assisted radio frequency identification transponders (RFID tags) that employs an integrated circuit to store and return a unique identifier. Active RFID transponders include a dedicated power source (e.g., a chemical battery cell) to power the RFID transponder. Passive RFID transponder do not include a dedicated power source, but rather derive power from an interrogation signal, typically charging a capacitor, which provides sufficient power to provide a return signal (e.g., back scatter signal) with unique identifying information imposed thereof. Battery-assisted RFID transponders generally detect an interrogation signal, but employ a dedicated power source (e.g., chemical battery cell) to primarily power the operations.

Also for example, micro-electro-mechanical systems (MEMS) transponders employ one or typically more mechanical elements which mechanically vibrate or oscillate at respective frequencies to return a unique identifier. These MEMS transponders are mechanically based and typically do not employ integrated circuits, nor do they typically store unique identifiers in memory. The terms "integrated circuit RFID transponder" and "non-MEMS RFID transponder" are used herein to distinguish non-mechanical RFID transponders from mechanical or MEMS based transponders.

The wireless transponder 50, according to one embodiment, may be able to withstand cold temperatures (e.g., negative 150 degrees Celsius; negative 196 degrees Celsius) and continue to operate. In particular, the wireless transponder 50 is preferably able to withstand multiple instances of temperature cycling between cold temperatures (e.g., negative 150 degrees Celsius; negative 196 degrees Celsius) and relatively warmer temperatures to which the containers may be exposed when removed from a cryogenic cooler or dewar. The wireless transponder 50 may advantageously take the form of passive wireless transponders, which rely on power from interrogation signals to provide responses, for example via backscattering. MEMS transponders may be particularly suitable for operation at cold temperatures.

Figure 6:
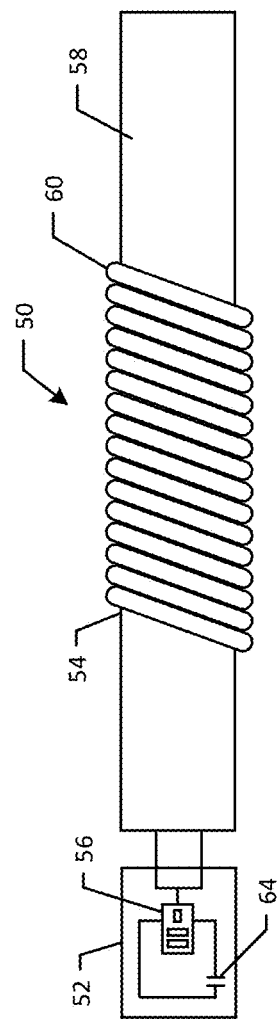
FIG. 6 is a side elevation view of a wireless transponder of the specimen holder, according to one embodiment.

Referring to FIG. 6, the wireless transponder 50 may include a printed circuit board 52 and an antenna 54. The printed circuit board 52 carrying a transponder circuit 56 (e.g., radio, transmitter, backscatter circuit) communicatively coupled to the antenna 54. As shown, the antenna 54 may include a rod 58, (e.g., a ferrite rod) with a coil 60 wound around the rod 58. The wireless transponder 50 may include a power source 64 (e.g., capacitor, chemical battery).

As shown in FIGS. 1 and 2, and described in additional detail below, the wireless transponder 50 may be enclosed within the sleeve 30 and thereafter the sleeve 30 may be attached to the body 12, thereby securing the wireless transponder 50 to the body 12. According to one embodiment, a potting agent may be used to position and retain the wireless transponder 50 within the sleeve 30.

Referring to FIGS. 7 to 10, a specimen collection system 100 may include a container 102 for holding biological samples, the container 102 including a vial 104 and a cap 106. According to one embodiment the vial 104 may be at least partially covered by an outer jacket 108, also called an outer sleeve or frame. The cap 106 is sized and shaped to removably close an opening 110 at a first end 112 of the vial 104. The vial 104 includes the first end 112, a second end 114, and a side wall 116 that extends between the first end 112 and the second end 114. The second end 114 may be opposed from the first end 112 across a length of the vial 104. The side wall 116 extends between the first end 112 and the second end 114 to delimit an interior of the vial 104 from an exterior thereof.

The vial 104 the second end 114 of the vial 104 may be closed or sealable. The vial 104 may take the form of a tube, which may have a circular profile or cross section, or alternatively may have other shapes (e.g., rectangular, hexagonal, octagonal). The opening 110 of the vial 104 may, for example, be circular as shown, although the opening 110 may have other shapes. The second end 114 of the vial 104 may, for example, terminate in a semi-spherical tip or may be frustoconical, terminating in a flat surface 118 which is perpendicular to a longitudinal axis 120 of the vial 104.

The specimen holder 10 may extend from the cap 106 as an integral, permanently fixed, or removably-attached element, according to at least one implementation. According to one embodiment, the specimen holder 10 may extend from a bottom surface 122, i.e., an interior-facing surface, of the cap 106. The specimen holder 10 may be fixed to bottom surface 122 of the cap 106, according to at least one embodiment. The specimen holder 10 may be fixed to the bottom surface 122 of the cap 106 in any of a variety of ways. For example, the specimen holder 10 may be interference or friction fitted in an aperture 124 in the bottom surface 122 of the cap 106. Also for example, the specimen holder 10 may be adhered to the bottom surface 122 of the cap 106.

The cap 106 may have a top portion 126 and a side wall 128 extending from the top portion 126, the side wall 128 delimiting a portion of the cap 106 which is smaller in extent relative to the top portion 126 in a direction perpendicular to the longitudinal axis 120 of the vial 104 so that the side wall 128 can be inserted into the interior of the vial 104, the top portion 126 acting as a stopper to limit the depth of insertion of the side wall 128 into the vial 104. The cap 106 may have threads 130, for example on an outer surface of the side wall 128 to mate with corresponding threads 132 on an inner surface of the side wall 116 of the vial 104.

Implementations may advantageously include a number of ports and/or vents 134. The ports advantageously allow ingress of liquid (e.g., liquid nitrogen) into an interior of the vial 104 while the cap 106 is in place on the vial 104, while the vents allow gas (e.g., air) to escape from the interior of the vial 104 as liquid enters the vial 104 while the cap 106 is in place on the vial 104. The ports may be located in the vial 104, in the cap 106, or in both the vial 104 and the cap 106.

According to one embodiment, the vents 134 are located toward the top (e.g., in the cap 106 or at least proximate a portion of the vial 104 closest to the cap 106), while the ports 134 are positioned toward the bottom (e.g., at least proximate the bottom of the vial 104), which allows liquid to leach in from the bottom of the container 100 and gas to vent out from the top as the container 100 is lowered into a cryogenic bath, e.g., in a dewar.

Although the term "vent" has been used herein to describe through-holes (which are not necessarily round), which allow gas (e.g., air) to escape the vial 104 and the term "port" has been used to describe through-holes which allow liquid nitrogen into the vial 104, these terms are interchangeable in some cases. For example, the structure of the through-holes used for the vents and ports 134 may be simple apertures and therefore may function primarily as vents or ports 134 depending on their position relative to the top and bottom of the container 100 and depending on operational conditions (e.g., depending on whether a container 100 is being lowered into or raised out of a cryogenic bath).

In some implementations, the ports and vents 134 may include valves, flaps, screens, filters, or other structures, to restrict the flow of gas or liquid to a specific direction vis-à-vis the interior of the vial 104 and this may result in structures which act as dedicated ports or vents 134. In some cases, the outer jacket 108 may include through-holes 136 that align with one or more of the ports or vents 134 in the vial 104 to facilitate ingress and egress of liquid and/or air.

The cap 106 may be formed of any of a variety of materials, for example polymers, for instance thermoplastics, such as polypropylene or polyethylene, and/or any other suitable material that withstand temperatures common in cryogenic applications without significant degradation. An outer surface of the top portion 126 of the cap 106 may include a plurality of facets 138 to facilitate gripping when tightening or loosening the cap 106. While the cap 106 is generally illustrated as having a portion thereof securely received within the opening of the vial 104, in some implementations, the cap 106 may alternatively be sized to receive a portion of the vial 104 within an opening in the cap 106.

According to one embodiment, the outer jacket 108 is shaped and sized to receive the vial 104 within a top opening of the jacket 108. Both the vial 104 and the outer jacket 108 may have, for example, a circular cross-section such that the circumference of an exterior surface of the vial 104 is approximately equal to a circumference of an inner surface of the outer jacket 108. Such a configuration allows for a snug fit between the vial 104 and the outer jacket 108. According to one embodiment, the second end 114 of the vial 104, e.g., the frustoconical tip which terminates in a flat surface 118, may be enclosed within the jacket 108, as shown. According to another embodiment, the second end 114 of the vial 104, e.g., the frustoconical tip which terminates in a flat surface 118, may extend from a bottom opening of the jacket 108.

The inner surface of the jacket 108 may be attached to the exterior surface of the vial, e.g., friction fitted, heat fitted, and/or via adhesive, in implementations in which the outer jacket 108 is to remain associated with the particular vial throughout the lifecycle of the container 100. In some implementations, the inner surface of the jacket 108 may be removably attached to the exterior surface of the vial 104 to allow removal and replacement of the outer jacket 108, e.g., if the outer jacket 108 is to be associated with more than one vial 104 (or vice versa). In such a case, there may be an elastic compression fit and/or a friction fit between the vial 104 and the outer jacket 108.

In implementations, the inner surface of the jacket 108 and/or the exterior surface of the vial 104 may include deformable protrusions 140 which compress elastically to form a compression fit between the vial 104 and the outer jacket 108. In implementations, the inner surface of the jacket 108 and/or the exterior surface of the vial 104 may include opposing threads or ridges to secure the vial 104 within the outer jacket 108 (or, in other words, to secure the outer jacket 108 to the vial 104). In implementations, outer jacket 108 may be manufactured separately from the vial 104 and, for example, retrofitted onto existing vials 104.

The outer jacket 108 may have openings through which the exterior surface of the vial 104 is visible, thereby allowing the contents of the vial 104 to be seen in implementations in which the vial 104 is transparent or translucent. The through-holes 136 may also function as the openings according to one embodiment. As shown, the through-holes/openings 136 may have longer sides which run along a direction along the longitudinal axis 120 of the outer jacket 108 and shorter sides which run along a direction perpendicular to the longitudinal axis 120 of the outer jacket 108, or curve around the circumference of the vial 104. According to one embodiment, the through-holes 136 are sized and shaped to correspond to the ports or vents 134 and therefore may be too small to provide visibility of the exterior surface of the vial 104. In such an implementation, the outer jacket 108 may include both the ports or vents 134 and the openings as separate elements.

In implementations, an arrangement of arms 142 may extend from the bottom of the jacket 108 along a longitudinal direction of the outer jacket 108 to support a platform 144, e.g., a solid, disk-shaped platform, which is oriented in a plane, which is normal to the longitudinal axis of the outer jacket 108. For example, there may be four of the arms 142 at positions which are 90 degrees apart around the circumference of the outer jacket 108. The arms 142 and the platform 140 may be positioned and sized so that an inner surface of the platform 140 forms a bottom interior surface of the jacket 108. The bottom interior surface of the jacket 108 may be in contact with, or nearly in contact with, the bottom portion of the vial 104 when the vial 104 is received in the outer jacket 108. The platform 140 may be attached to ends of the arms 142 or may be integrally formed with the arms 142, such as, for example, in a thermoplastic manufacturing process. The outer jacket 108 may include one or more visual markings 146 that facilitate identification of the outer jacket 108. The visual markings 146 may include letters, numbers, bar codes, QR codes, or any combination thereof.

The container 100 may include one or more of the wireless transponders, such as one or more of the wireless transponders 50 may be carried by the vial 104, the cap 106, the outer jacket 108 (e.g., by the platform 144 or a main body of the outer jacket 108 from which the arms 142 extend toward the platform 144), or any combination thereof.

Referring to FIGS. 11 to 14, the proximal portion 25 of the body 12 may include the coupler 28, as shown in the illustrated embodiment. The coupler 28 may include a receiver formed in the proximal portion 25 of the body 12, as shown, or may include a stem extending from the proximal portion 25. According to one embodiment, the coupler 28 includes one or more movable members 17 positioned within an internal cavity 66 formed by the proximal portion 25 of the body 12. The internal cavity 66 may have an opening 68 formed in the proximal end 20. The internal cavity 66 may extend distally from the opening 68 terminating at a base surface 70.

As shown in the illustrated embodiment, the movable member 17 may be a resilient member that includes a base 72 that extends from a portion of the proximal portion 25 of the body 12. The resilient member may also include a tip 74 supported by the base 72. The tip 74 may be a free end such that the tip 74 is moveable towards and away from a longitudinal, central axis 80 of the body 12. The tip 74 may include a first surface 76 that faces in the proximal component P and a second surface 78 that faces in the distal component D. According to one embodiment, the first surface 76 may be shaped so as to facilitate movement of a member entering the internal cavity 66 through the opening 68 and toward the base surface 70, while the second surface is shaped so as to block movement of the member exiting the internal cavity 66 through the opening 68 and moving away from the base surface 70. According to another embodiment, the movable member 17 may be translatable or rotatable relative to a remainder of the body 12.

The first surface 76 may be oblique with respect to the longitudinal, central axis 80. According to one embodiment, the first surface 76 may be angularly offset from the longitudinal, central axis 80 by between 10 degrees and 45 degrees. According to one embodiment, the first surface 76 may be angularly offset from the longitudinal, central axis 80 by 25 degrees. The second surface 78 may be perpendicular to the longitudinal, central axis 80, or at some other angular offset such that movement of a member out of the internal cavity 66, as described in further detail below, is blocked or at least hindered.

According to one embodiment, the body 12 may include first and second body surfaces separated by a length L2 measured along the longitudinal direction L. As shown in the illustrated embodiment, the first and second body surfaces separated by the length L2 may include the proximal end 20 and the second surface 78 of the tip 74 of the movable member 17. According to one embodiment, the first and second body surfaces may both be part of the movable member 17 (e.g., the first surface 76 and the second surface 78).

The first and second body surfaces, as shown, may each be angularly offset with respect to the longitudinal, central axis 80. According to one embodiment the first and second body surfaces are parallel. According to one embodiment the first and second sleeve surfaces are nonparallel. According to one embodiment, at least one of the first and second body surfaces is perpendicular to the longitudinal, central axis 80.

The first and second body surfaces may face away from each other (e.g., the first body surface faces at least partially in the proximal component P of the longitudinal direction L and the second body surface faces at least partially in the distal component D of the longitudinal direction L). According to one embodiment, the first and second body surfaces may face toward each other. The first and second body surfaces may be perpendicular to and face in the respective component of the longitudinal direction L, as shown. According to another embodiment, at least one of the first and second body surfaces may be oblique to and face in the respective component of the longitudinal direction L.

The illustrated embodiment of the body 12 is shown including two movable members 17, with only one of the movable members 17 called out by the reference numerals to increase the clarity of the drawings. The body 12 may include other numbers of the movable member 17, for example one, or more than two. The movable members 17 may be evenly spaced radially about the central, longitudinal axis 80 (i.e., as shown), or non-uniformly spaced.

Figure 15:
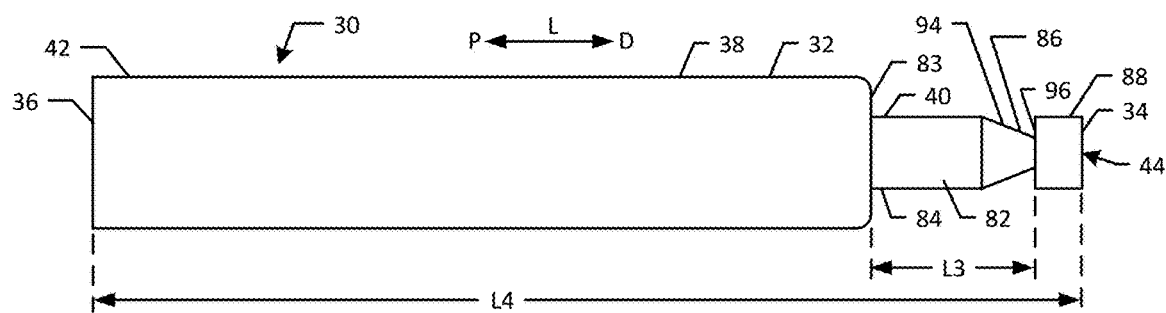
FIG. 15 is a side, elevation view of a sleeve of the specimen holder illustrated in FIG. 1, according to one embodiment.
Figure 16:
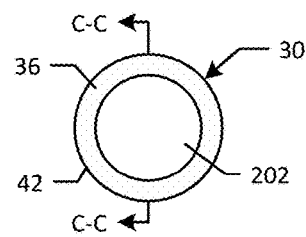
FIG. 16 is a rear, elevation view of the sleeve illustrated in FIG. 15.
Figure 17:
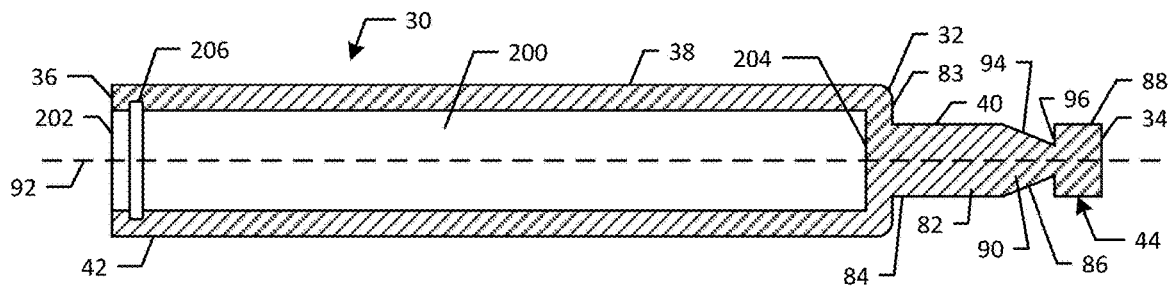
FIG. 17 is a cross-sectional, side, elevation view of the sleeve illustrated in FIG. 15, along line C-C.

Referring to FIGS. 15 to 17, the distal portion 40 of the sleeve 30 may include the coupler 44, as shown in the illustrated embodiment. The coupler 44 may include a stem extending from the distal portion 40 of the sleeve 30, as shown, or may include a receiver formed in the distal portion 40. The stem of the receiver may be complementary to the receiver or the stem of the body 12 to mate therewith. According to one embodiment, the coupler 44 is sized to be positioned within the internal cavity 66 of the body 12 (shown in FIG. 13). The coupler 44 may be in the form of a projection 82 extending from a first surface 83 in the distal component D.

According to one embodiment, the projection 82 may include a base 84, an intermediate portion 86, and a tip 88. The tip 88 may be in the form of a lug extending either radially or laterally outward from a remainder of the projection 82. The intermediate portion 86 may include an area 90 with a reduced cross-sectional thickness, relative to the tip 88 and the base 84. According to one embodiment, the tip 88 and the base 84 have equal cross-sectional thicknesses. The intermediate portion 86 may include a first surface 94 that faces in the distal component D and a second surface 96 that faces in the proximal component P.

The first surface 94 may be oblique with respect to the longitudinal, central axis 92. According to one embodiment, the first surface 94 may be angularly offset from the longitudinal, central axis 92 by between 10 degrees and 45 degrees. According to one embodiment, the first surface 94 may be angularly offset from the longitudinal, central axis 92 by 25 degrees. According to one embodiment, the first surface 94 may be angularly offset from the longitudinal, central axis 92 by the same angle as the first surface 76 is offset from the longitudinal, central axis 80. The second surface 96 may be perpendicular to the longitudinal, central axis 92. According to one embodiment, the second surface 96 may be angularly offset from the longitudinal, central axis 92 by the same angle as the second surface 78 is offset from the longitudinal, central axis 80.

According to one embodiment, the sleeve 30 may include first and second sleeve surfaces separated by a length L3 measured along the longitudinal direction L. As shown in the illustrated embodiment, the first and second sleeve surfaces separated by the length L3 may include the first surface 83 and the second surface 96 of the projection 82. According to one embodiment, the first and second sleeve surfaces may both be part of the projection 82 (e.g., the distal end 34 and the second surface 96).

The first and second sleeve surfaces may face toward each other (e.g., the first sleeve surface faces at least partially in the distal component D of the longitudinal direction L and the second sleeve surface faces at least partially in the proximal component P of the longitudinal direction L). According to one embodiment, the first and second sleeve surfaces may face away from each other. The first and second sleeve surfaces may be perpendicular to and face in the respective component of the longitudinal direction L, as shown. According to another embodiment, at least one of the first and second sleeve surfaces may be oblique to and face in the respective component of the longitudinal direction L.

The first and second sleeve surfaces, as shown, may each be angularly offset with respect to the longitudinal, central axis 92. According to one embodiment the first and second sleeve surfaces are parallel. According to one embodiment the first and second sleeve surfaces are nonparallel. According to one embodiment, at least one of the first and second sleeve surfaces is perpendicular to the longitudinal, central axis 92. Each of the first and second sleeve surfaces may be complimentary to one of the first and second body surfaces. For example, upon attachment of the body 12 and the sleeve 30, the first body surface mates with the first sleeve surface and the second body surface mates with the second sleeve surface.

According to one embodiment, the proximal portion 42 of the sleeve 30 may form an internal cavity 200 having an opening 202 formed in the proximal end 36. As shown in the illustrated embodiment, the internal cavity 200 may extend distally from the opening 202 and terminate at a base surface 204. The proximal portion 42 may include a second coupler 206 to attach the cap 46 (shown in FIG. 18) to the sleeve 30, as described in greater detail below. According to one embodiment, the coupler 206 may include a groove or threads.

The sleeve 30 has a length L4 measured from one of the distal end 34 and the proximal end 36 to the other of the distal end 34 and the proximal end 36 along the longitudinal direction L. According to one embodiment, the length L4 of the sleeve 30 is less than the length L1 of the body 12. According to one embodiment, the length L4 of the sleeve 30 is less than 25 percent of the length L1 of the body 12. According to one embodiment, the length L4 of the sleeve 30 is less than 10 percent of the length L1 of the body 12.

Referring to FIGS. 11 to 17, the coupler 28 and the coupler 44 may be reversed, such that the sleeve 30 includes the movable member 17 and the body 12 includes the intermediate portion 86 and the tip 88.

Referring to FIGS. 18 to 21, the cap 46 may have a top portion 210 and a side wall 212 extending from the top portion 210, the side wall 212 delimiting a portion of the cap 46 which is smaller in extent relative to the top portion 210. The cap 46 may have one or more couplers 214 that includes threads or one or more projections. The coupler 214 may be integral with the side wall 212, according to one embodiment. The coupler 214 may be a compressible member, or may be spring biased.

Referring to FIGS. 22 to 25, a structure, for example a kit, for attachment to a specimen collection body, such as the body 12, may include the sleeve 30 and the wireless transponder. The sleeve 30 may have a snap fit portion, for example the projection 82, at one end thereof that is sized to snap fit to a complimentary snap fit structure, for example the proximal portion 25 including the movable member 17, on an end of the specimen collection body. The wireless transponder 50 may be attached to the sleeve 30. The wireless transponder 50 may include at least one antenna and a microchip communicatively coupled to the at least one antenna. The structure or kit may be used to retrofit an existing specimen collection body, for example so as to turn a "dumb" specimen collection body (devoid of any identification information) into a "smart" specimen collection body.

Referring to FIGS. 11 to 25, a method of assembling the specimen holder 10 may include attaching the wireless transponder 50 to the sleeve 30, for example by positioning the wireless transponder 50 within the internal cavity 200 of the sleeve 30. Positioning the wireless transponder 50 within the internal cavity 200 of the sleeve 30 may include moving the wireless transponder 50 through the opening 202 and toward the base surface 204. The method may include securing a position of the wireless transponder 50 within the internal cavity 200, for example by filling the internal cavity 200 and thereby surrounding the wireless transponder 50 with a potting material.

The method may include blocking the opening 202, for example by attaching the cap 46 to the sleeve 30. Attaching the cap 46 to the sleeve 30 may include moving the cap 46 in the distal component D with respect to the sleeve 30, thereby inserting the side wall 212 into the inner cavity 200, until the coupler 206 of the sleeve 30 engages with the coupler 214 of the cap 46. Other methods of attaching the cap 46 to the sleeve 30, such as applying an adhesive, may be employed.

The method may include attaching the sleeve 30 to the body 12, for example by attaching the distal portion 40 of the sleeve 30 to the proximal portion 25 of the body 12. According to one embodiment, attaching the sleeve 30 to the body 12 includes moving at least one of the sleeve 30 and the body 12 relative to the other of the sleeve 30 and the body 12 in a first direction that is parallel to the body longitudinal axis 80, for example moving the coupler 44 through the opening 68, into the inner cavity 66, and toward the base surface 70. Attaching the sleeve 30 to the body 12 includes abutting the tip 88 with one or more of the movable members 17. While abutting the tip 88 with one or more of the movable members 17, continued distal movement of the sleeve 30 relative to the body 12 forces the one or more movable members 17 to move, for example flex, away from the longitudinal, central axis 80, as shown in FIG. 22.

Upon alignment of the intermediate portion 86 and the tip 74, the one or more movable members 17 move back, for example via a biasing force inherent in the one or more movable members 17, toward the longitudinal, central axis 80, as shown in FIG. 23. Once the one or more movable members 17 move back toward the longitudinal, central axis 80, the second surface 78 and the second surface 96 may be aligned with respect to the longitudinal direction L. Movement of the one or more movable members 17 back toward the longitudinal, central axis 80 may result in an audible indication, for example a click or snap, indicating that the sleeve 30 is now attached to the body 12.

As shown in the illustrated embodiment, the length L2 between the first and second body surfaces (e.g., the proximal end 20 and the second surface 78) and the length L3 between the first and second sleeve surfaces (e.g., the first surface 83 and the second surface 96 of the projection 82) may correspond. For example the length L3 may be slightly smaller than the length L2 such that the first and second body surfaces are able to be captured between the first and second sleeve surfaces. The first and second body surfaces may be captured such that movement of the sleeve 30 relative to the body 12 in a component of the longitudinal direction L is blocked by abutment of one of the first and second body surfaces and one of the first and second sleeve surfaces. As shown, alignment and abutment of the second surface 78 and the second surface 96 blocks movement of the sleeve 30 in the proximal component P relative to the body 12, and alignment and abutment of the first surface 83 and the proximal end 20 blocks movement of the sleeve 30 in the distal component D relative to the body 12.

According to one embodiment, the tip 88 may be trapped between the second surface 78 and the base surface 70, thereby preventing any movement of the sleeve 30 relative to the body 12 in either the proximal component P or the distal component D.

The specimen holder 10, and method of assembling the specimen holder 10, as described herein may provide advantages in procedures that include collection of biological samples. For example, the positioning of the sleeve 30 and the enclosed wireless transponder 50 at the proximal end 20 of the body 12 (opposite the portion of the body 12 which retains the specimen 14) enables the attachment of the wireless transponder 50 after collection of the specimen 14, without disturbing the specimen 14. Additionally, the position of the wireless transponder 50 opposite the specimen 14 enables a reader of the wireless transponder 50 to interrogate the wireless transponder 50 without coming into proximity and/or disturbing the specimen 14.

The snap-fit provided by engagement of the movable member 17 and the projection 82 enables quick attachment of the sleeve 30 (and enclosed wireless transponder 50) with the body 12 (and collected specimen 14, if already collected) without the need for tools or additional parts (e.g., fasteners, adhesives, etc.). This may be beneficial in procedures that include specimen 14 that require strict temperature control, for example a specimen 14 which must be vitrified quickly to ensure the specimen 14 remains viable.

Referring to FIG. 24, attaching the sleeve 30 to the body 12 may include inserting a projection 208 of the body into a recess 210 of the body 12, the recess 210 having a shape that corresponds to a shape of the projection 208. As shown, the body 12 and the sleeve 30 may be devoid of the movable member 17. An adhesive may be applied to one or both of the projection 208 and the recess 210, for example prior to insertion of the projection 208 into the recess 210, to secure the sleeve 30 and the body 12.

Referring to FIG. 25, the sleeve 30 may be attached to the body 12 without moving the sleeve 30 through the inner cavity 66 toward the base surface. For example, a portion of the sleeve 30, for example the coupler 44 may be formed, for example injection molded, inside the inner cavity 66. As shown, the body 12 and the sleeve 30 may be devoid of the movable member 17.

Figure 26:
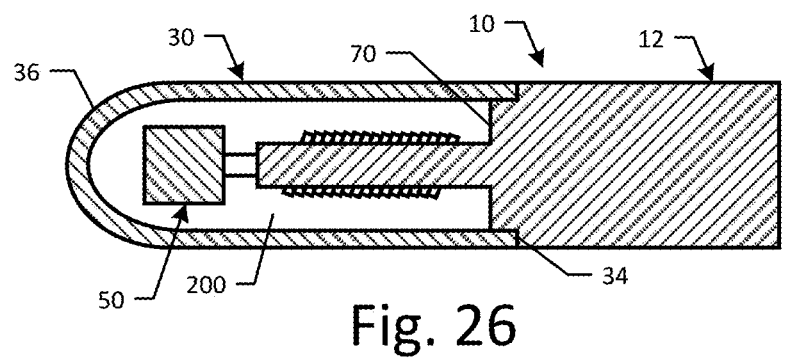
FIG. 26 is a cross-sectional, side view of a portion of the specimen holder illustrated in FIG. 1, along line A-A according to another embodiment.
Figure 27:
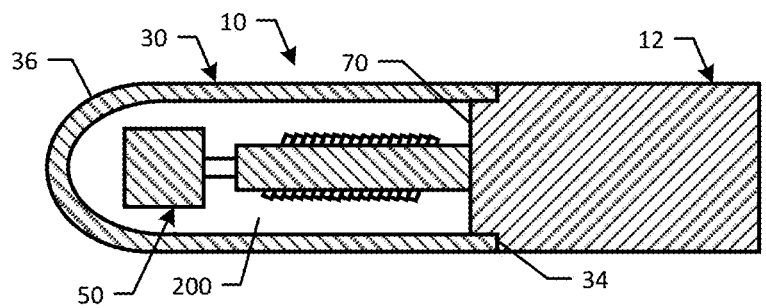
FIG. 27 is a cross-sectional, side view of a portion of the specimen holder illustrated in FIG. 1, along line A-A according to another embodiment.
Figure 28:
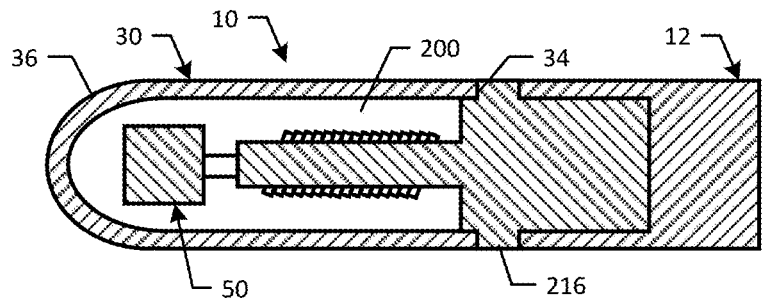
FIG. 28 is a cross-sectional, side view of a portion of the specimen holder illustrated in FIG. 1, along line A-A according to another embodiment.

Referring to FIGS. 26 to 28, the sleeve 30 the inner cavity 200 may be open to the distal end 34 of the sleeve 30 and closed to the proximal end 36 of the sleeve 30. As shown in the illustrated embodiment, the specimen holder 10 may be devoid of the cap 64. After positioning the wireless transponder 50 within the inner cavity 200, the inner cavity 200 may be closed by securing the distal end 34 of the sleeve 30 to the body 12, either directly (as shown in FIGS. 26 and 27) or indirectly, via a spacer 216, (as shown in FIG. 28). According to one embodiment, the sleeve 30 may be integral with the body 12, for example the sleeve 30 may be insert molded into the body 12.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. These and other changes can be made to the embodiments in light of the above-detailed description.

Many of the methods described herein can be performed with variations. For example, many of the methods may include additional acts, omit some acts, and/or perform acts in a different order than as illustrated or described. The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. patent application Ser. No.

17/547,094, filed Dec. 9, 2021 and U.S. patent application 63/123,959, filed Dec. 10, 2020 are incorporated herein by reference, in its entirety.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of assembling a specimen holder, the method comprising:
   attaching a wireless transponder to a sleeve;
   attaching a distal portion of the sleeve to a proximal portion of a body, the body elongated along a body longitudinal axis, the proximal portion of the body opposite a distal portion of the body with respect to the body longitudinal axis, wherein the distal portion of the body includes a specimen retention surface;
   moving at least one of the sleeve and the body relative to the other of the sleeve and the body in a first direction that is parallel to the body longitudinal axis;
   moving a first surface carried by a movable member away from the body longitudinal axis while moving at least one of the sleeve and the body relative to the other of the sleeve and the body;
   moving the first surface carried by the movable member toward the body longitudinal axis while moving at least one of the sleeve and the body relative to the other of the sleeve and the body;
   aligning the first surface with a second surface thereby blocking movement of the sleeve relative to the body along one direction parallel to the body longitudinal axis after moving at least one of the sleeve and the body relative to the other of the sleeve and the body;
   aligning a third surface with a fourth surface thereby blocking movement of the sleeve relative to the body along the other direction parallel to the body longitudinal axis; and
   securing the sleeve to the body such that motion of the sleeve relative to the body parallel to the body longitudinal axis is prevented,
   wherein one of the body and the sleeve carries the movable member and the other of the body and the sleeve includes the second surface, the one of the body and the sleeve includes the third surface, and the other of the body and the sleeve includes the fourth surface.

2. The method of claim 1 wherein the proximal portion of the body has a first cross-sectional dimension measured in a direction perpendicular to the body longitudinal axis, the distal portion of the body has a second cross-sectional dimension measured in the direction perpendicular to the body longitudinal axis, the first cross-sectional dimension is greater than the second cross-sectional dimension, and attaching the distal portion of the sleeve to the proximal portion of the body includes attaching the distal portion of the sleeve to a portion of the body that has the first cross-sectional dimension.

3. The method of claim 1 wherein the body carries the movable member, and wherein moving at least one of the sleeve and the body relative to the other of the sleeve and the body, further comprises:
   passing a projection of the sleeve through an opening formed in the proximal portion of the body.

4. The method of claim 1 wherein the sleeve at least partially encloses an internal cavity, and the method further comprises:
   securing the wireless transponder within the internal cavity, and
   wherein securing the wireless transponder within the internal cavity includes at least partially filling the internal cavity with a potting material.

5. The method of claim 1, further comprising:
   after positioning the wireless transponder within the internal cavity, blocking an opening of the internal cavity through which the wireless transponder passed,
   wherein the opening is formed in a proximal portion of the sleeve, the proximal portion of the sleeve opposite the distal portion of the sleeve along a sleeve longitudinal axis, and the method further comprises abutting a cap with the proximal portion of the sleeve, thereby blocking the opening of the internal cavity.

6. The method of claim 1, further comprising:
   engaging the distal portion of a body with a specimen such that the specimen is retained on the specimen retention surface of the distal portion of the body.

* * * * *